US011400434B2

(12) United States Patent
Wong et al.

(10) Patent No.: US 11,400,434 B2
(45) Date of Patent: *Aug. 2, 2022

(54) MULTI-FUNCTIONAL COMPOSITION OF MATTER FOR REMOVAL OF MERCURY FROM HIGH TEMPERATURE FLUE GAS STREAMS

(71) Applicant: ADA Carbon Solutions, LLC, Littleton, CO (US)

(72) Inventors: Joseph M. Wong, Castle Pines, CO (US); Christopher Vizcaino, Littleton, CO (US); Robert B. Huston, Longmont, CO (US); Frederick S. Cannon, State College, PA (US); Jacob B. Lowring, Coushatta, LA (US); Jacqueline Cecil de Peyer, Bailey, CO (US)

(73) Assignee: ADA Carbon Solutions, LLC, Littleton, CO (US)

( * ) Notice: Subject to any disclaimer, the term of this patent is extended or adjusted under 35 U.S.C. 154(b) by 9 days.

This patent is subject to a terminal disclaimer.

(21) Appl. No.: 16/911,161

(22) Filed: Jun. 24, 2020

(65) Prior Publication Data
US 2020/0324273 A1 Oct. 15, 2020

Related U.S. Application Data

(63) Continuation of application No. 14/498,542, filed on Sep. 26, 2014, now Pat. No. 10,722,865, which is a continuation-in-part of application No. 13/587,140, filed on Aug. 16, 2012, now Pat. No. 9,539,538.

(60) Provisional application No. 61/553,000, filed on Oct. 28, 2011.

(51) Int. Cl.
*B01D 53/64* (2006.01)
*B01J 20/28* (2006.01)
*B01J 20/20* (2006.01)
*B01J 20/04* (2006.01)
*B01D 53/86* (2006.01)
*F23J 15/00* (2006.01)
*F23J 15/04* (2006.01)
*B01D 53/83* (2006.01)

(52) U.S. Cl.
CPC ........ *B01J 20/28071* (2013.01); *B01D 53/64* (2013.01); *B01D 53/8665* (2013.01); *B01J 20/046* (2013.01); *B01J 20/20* (2013.01); *B01J 20/28016* (2013.01); *F23J 15/003* (2013.01); *F23J 15/04* (2013.01); *B01D 53/83* (2013.01); *B01D 2253/102* (2013.01); *B01D 2253/106* (2013.01); *B01D 2253/112* (2013.01); *B01D 2253/304* (2013.01); *B01D 2253/308* (2013.01); *B01D 2253/31* (2013.01); *B01D 2253/311* (2013.01); *B01D 2255/2022* (2013.01); *B01D 2255/2045* (2013.01); *B01D 2255/2047* (2013.01); *B01D 2255/2094* (2013.01); *B01D 2255/20738* (2013.01); *B01D 2255/20792* (2013.01); *B01D 2255/702* (2013.01); *B01D 2255/9202* (2013.01); *B01D 2257/602* (2013.01); *B01D 2258/0283* (2013.01); *F23J 2215/60* (2013.01); *F23J 2219/20* (2013.01); *F23J 2219/30* (2013.01); *F23J 2219/40* (2013.01); *Y10T 428/2982* (2015.01)

(58) Field of Classification Search
None
See application file for complete search history.

(56) References Cited

U.S. PATENT DOCUMENTS

| | | | |
|---|---|---|---|
| 3,803,803 | A | 4/1974 | Raduly et al. |
| 3,873,581 | A | 3/1975 | Fitzpatrick et al. |
| 4,077,809 | A | 3/1978 | Piunguian et al. |

(Continued)

FOREIGN PATENT DOCUMENTS

| | | |
|---|---|---|
| CN | 1050736 | 4/1991 |
| CN | 101175692 | 5/2008 |

(Continued)

OTHER PUBLICATIONS

U.S. Appl. No. 15/930,145, filed May 12, 2020, Li et al.

(Continued)

*Primary Examiner* — Sheng H Davis
(74) *Attorney, Agent, or Firm* — Sheridan Ross P.C.

(57) ABSTRACT

A multi-functional composition of matter that is useful for injection into a flue gas stream to rapidly and efficiently remove mercury from the flue gas streams, particularly at above average flue stream temperatures of about 340° F. or higher. The multi-functional composition of matter may include a fixed carbon content of at least about 20 wt. %, a mineral content of from about 20 wt. % to about 50 wt. %, a sum of micropore plus mesopore volume of at least about 0.20 cc/g, a micropore volume to mesopore volume ratio of at least about 0.7, and a tapped density of not greater than about 0.575 g/ml. These compositions may be further characterized by number of particles per gram of the composition of matter such that the composition may have at least about 0.8 billion particles per gram, or even as many as 1.5 billion particles per gram. These physical and chemical properties may enhance (1) the oxidation reaction kinetics for the oxidation of mercury species, (2) frequency of contact events, and (3) capture and sequestration of mercury, to achieve efficient mercury capture by the composition even in high temperature flue gas streams.

20 Claims, 7 Drawing Sheets

(56) References Cited

U.S. PATENT DOCUMENTS

| | | | |
|---|---|---|---|
| 4,642,304 A | 2/1987 | Karl et al. |
| 4,729,882 A | 3/1988 | Ide et al. |
| 4,963,519 A | 10/1990 | Okabayashi et al. |
| 4,976,848 A | 12/1990 | Johnson |
| 5,368,754 A | 11/1994 | Von Klock et al. |
| 5,607,496 A | 3/1997 | Brooks |
| 5,659,110 A | 8/1997 | Herden et al. |
| 5,695,726 A | 12/1997 | Lerner |
| 5,854,173 A | 12/1998 | Chang et al. |
| 5,880,061 A | 3/1999 | Yoshino et al. |
| 5,972,525 A | 10/1999 | Mori et al. |
| 6,027,551 A | 2/2000 | Hwang et al. |
| 6,064,560 A | 5/2000 | Hirahara et al. |
| 6,150,300 A | 11/2000 | Khare et al. |
| 6,326,326 B1 | 12/2001 | Feng et al. |
| 6,558,454 B1 | 5/2003 | Chang et al. |
| 6,582,497 B1 | 6/2003 | Maes et al. |
| 6,818,043 B1 | 11/2004 | Chang et al. |
| 6,848,374 B2 | 2/2005 | Srinivasachar et al. |
| 6,953,494 B2 | 10/2005 | Nelson, Jr. |
| 7,141,091 B2 | 11/2006 | Chang |
| 7,361,209 B1 | 4/2008 | Durham et al. |
| 7,429,330 B2 | 9/2008 | Vo et al. |
| 7,435,286 B2 | 10/2008 | Olson et al. |
| 7,479,263 B2 | 1/2009 | Chang et al. |
| 7,514,052 B2 | 4/2009 | Lissianski et al. |
| 7,572,421 B2 | 8/2009 | Yang et al. |
| 7,578,869 B2 | 8/2009 | Yang et al. |
| 7,704,921 B2 | 4/2010 | Bool, III et al. |
| 7,722,843 B1 | 5/2010 | Srinivasachar |
| 7,731,780 B1 | 6/2010 | Durham et al. |
| 7,753,992 B2 | 7/2010 | Yang et al. |
| 7,766,997 B2 | 8/2010 | Lindau |
| 7,771,700 B2 | 8/2010 | Mauldin et al. |
| 7,776,780 B1 | 8/2010 | Granite et al. |
| 7,780,765 B2 | 8/2010 | Srinivasachar et al. |
| 7,858,061 B2 | 12/2010 | Varma et al. |
| 7,887,618 B2 | 2/2011 | Nelson |
| 8,007,749 B2 | 8/2011 | Chang et al. |
| 8,017,550 B2 | 9/2011 | Chao et al. |
| 8,057,576 B1 | 11/2011 | Pollack |
| 8,069,797 B2 | 12/2011 | Srinivasachar et al. |
| 8,080,088 B1 | 12/2011 | Srinivasachar |
| 8,309,046 B2 | 11/2012 | Pollack et al. |
| 8,329,614 B2 | 12/2012 | Chao et al. |
| 8,500,853 B2 | 8/2013 | Rood et al. |
| 8,524,186 B2 | 9/2013 | Kawamura et al. |
| 9,314,767 B2 | 4/2016 | McMurray et al. |
| 9,468,904 B2 | 10/2016 | McMurray et al. |
| 9,539,538 B2 | 1/2017 | Wong et al. |
| 9,561,462 B2 | 2/2017 | McMurray et al. |
| 10,035,126 B2 | 7/2018 | McMurray et al. |
| 10,137,403 B2 | 11/2018 | McMurray et al. |
| 10,159,928 B2 | 12/2018 | McMurray |
| 10,307,706 B2 | 6/2019 | Li et al. |
| 10,421,037 B2 | 9/2019 | Li et al. |
| 10,449,492 B2 | 10/2019 | Huston et al. |
| 10,456,745 B2 | 10/2019 | Huston et al. |
| 10,682,605 B2 | 6/2020 | Li et al. |
| 10,722,865 B2 | 7/2020 | Wong et al. |
| 10,730,011 B2 | 8/2020 | Wong et al. |
| 2001/0002387 A1 | 5/2001 | Tsutsumi et al. |
| 2002/0120228 A1 | 8/2002 | Maa et al. |
| 2002/0198097 A1 | 12/2002 | El-Shoubary et al. |
| 2003/0096702 A1 | 5/2003 | Frazier |
| 2003/0206843 A1 | 11/2003 | Nelson, Jr. |
| 2006/0034743 A1 | 2/2006 | Radway et al. |
| 2007/0104631 A1 | 5/2007 | Durante et al. |
| 2007/0123419 A1 | 5/2007 | Le Bec |
| 2007/0234902 A1 | 10/2007 | Fair et al. |
| 2007/0254807 A1 | 11/2007 | Bisque et al. |
| 2007/0265161 A1 | 11/2007 | Gadkaree et al. |
| 2008/0121142 A1 | 5/2008 | Comrie et al. |
| 2008/0254972 A1 | 10/2008 | Istvan et al. |
| 2008/0286183 A1 | 11/2008 | Radway |
| 2009/0007785 A1 | 1/2009 | Kimura et al. |
| 2009/0038632 A1 | 2/2009 | Cashmore et al. |
| 2009/0081092 A1 | 3/2009 | Yang et al. |
| 2009/0111690 A1 | 4/2009 | Gadkaree et al. |
| 2009/0136401 A1 | 5/2009 | Yang et al. |
| 2009/0233789 A1 | 9/2009 | Gadkaree et al. |
| 2010/0018395 A1 | 1/2010 | Srinivasachar et al. |
| 2010/0041119 A1 | 2/2010 | Christensen et al. |
| 2010/0126345 A1 | 5/2010 | Gupta et al. |
| 2010/0202946 A1 | 8/2010 | Yang et al. |
| 2011/0030592 A1 | 2/2011 | Baidrey et al. |
| 2011/0076210 A1 | 3/2011 | Pollack et al. |
| 2011/0250111 A1* | 10/2011 | Pollack .................. C10L 10/00 |
| | | 423/210 |
| 2012/0222410 A1 | 9/2012 | Maly et al. |
| 2012/0264600 A1* | 10/2012 | Tso .................. B01J 20/0237 |
| | | 502/405 |
| 2014/0186625 A1 | 7/2014 | Wong et al. |
| 2014/0191157 A1 | 7/2014 | Wong et al. |
| 2015/0235326 A1 | 8/2015 | Hansen et al. |
| 2016/0214078 A1 | 7/2016 | Li et al. |
| 2016/0296908 A1 | 10/2016 | Li et al. |
| 2017/0043316 A1 | 2/2017 | Li et al. |
| 2017/0043321 A1 | 2/2017 | Li et al. |
| 2018/0028970 A1 | 2/2018 | Huston et al. |
| 2018/0029006 A1 | 2/2018 | Li et al. |
| 2018/0029008 A1 | 2/2018 | Li et al. |
| 2018/0029009 A1 | 2/2018 | Li et al. |
| 2018/0170773 A1 | 6/2018 | Mitchek et al. |
| 2019/0291041 A1 | 9/2019 | McMurray et al. |
| 2019/0358578 A1 | 11/2019 | McMurray et al. |
| 2020/0047107 A1 | 2/2020 | Cayton |
| 2020/0114311 A1 | 4/2020 | Huston et al. |
| 2020/0129924 A1 | 4/2020 | Huston et al. |

FOREIGN PATENT DOCUMENTS

| | | |
|---|---|---|
| CN | 101687173 | 3/2010 |
| CN | 102078797 | 6/2011 |
| CN | 104023824 | 9/2014 |
| WO | WO 2008/143831 | 11/2008 |
| WO | WO 2013063490 | 5/2013 |
| WO | WO 2013082157 | 6/2013 |

OTHER PUBLICATIONS

International Search Report and Written Opinion dated Feb. 25, 2013 in connection with International Application No. PCT/US2012/062253.

International Preliminary Report on Patentability dated May 8, 2014 in connection with International Patent Application No. PCT/US2012/062253; 11 pp.

Office Action dated Apr. 15, 2015 in connection with Chinese Application No. 201280065337.X.

Decision to Grant dated Feb. 23, 2016 in connection with Chinese Application No. 201280065337.X.

Office Action dated Jan. 7, 2015 for U.S. Appl. No. 13/587,140.

Office Action dated Apr. 24, 2015 for U.S. Appl. No. 13/587,140.

Office Action dated Jan. 22, 2016 for U.S. Appl. No. 13/587,140.

Notice of Allowance dated Sep. 12, 2016 for U.S. Appl. No. 13/587,140.

Office Action dated Jan. 26, 2018 for U.S. Appl. No. 15/401,824.

Final Office Action dated Sep. 18, 2018 for U.S. Appl. No. 15/401,824.

Official Action for U.S. Appl. No. 15/401,824, dated Aug. 19, 2019 17 pages.

Notice of Allowance for U.S. Appl. No. 15/401,824, dated Mar. 25, 2020 12 pages.

Office Action dated Nov. 4, 2015 for U.S. Appl. No. 14/498,542.

Office Action dated Jun. 21, 2016 for U.S. Appl. No. 14/498,542.

Office Action dated Mar. 13, 2017 for U.S. Appl. No. 14/498,542.

Office Action dated Aug. 4, 2017 for U.S. Appl. No. 14/498,542.

Office Action dated Dec. 12, 2017 for U.S. Appl. No. 14/498,542.

Final Office Action dated Sep. 18, 2018 for U.S. Appl. No. 14/498,542.

Official Action for U.S. Appl. No. 14/498,542, dated Aug. 16, 2019 17 pages.

(56) References Cited

OTHER PUBLICATIONS

Notice of Allowance for U.S. Appl. No. 14/498,542, dated Mar. 20, 2020 13 pages.

* cited by examiner

MULTI-FUNCTIONAL COMPOSITION OF MATTER FOR REMOVAL OF MERCURY FROM HIGH TEMPERATURE FLUE GAS STREAMS

CROSS-REFERENCE TO RELATED APPLICATIONS

This application claims priority as a continuation-in-part (CIP) of U.S. patent application Ser. No. 13/587,140 filed Aug. 16, 2012, which claims priority to U.S. Provisional Patent Application No. 61/553,000, filed Oct. 28, 2011, entitled "MULTI-FUNCTIONAL COMPOSITION FOR RAPID REMOVAL OF MERCURY FROM A FLUE GAS." Each of the foregoing applications is incorporated herein by reference in its entirety.

FIELD

This disclosure relates to the field of compositions for the rapid and efficient removal of mercury from a high temperature fluid stream such as a flue gas stream.

BACKGROUND

Mercury (Hg) is a highly toxic compound and exposure at appreciable levels can lead to adverse health effects for people of all ages, including harm to the brain, heart, kidneys, lungs, and immune system. Mercury is naturally occurring but is also emitted from various human activities, such as burning fossil fuels and other industrial processes. For example, in the United States about 40% of the mercury introduced into the environment comes from coal-fired power plants.

In the United States and Canada, federal and state/provincial regulations have been implemented or are being considered to reduce mercury emissions, particularly from coal-fired power plants, steel mills, cement kilns, waste incinerators and boilers, industrial coal-fired boilers, and other coal combusting facilities. For example, the United States Environmental Protection Agency (U.S. EPA) has promulgated Mercury Air Toxics Standards (MATS), which would among other things require coal-fired power plants to capture approximately 90% of their mercury emissions beginning in 2015.

The leading technology for mercury control from coal-fired power plants is activated carbon injection. Activated carbon injection involves the injection of sorbents, particularly powdered activated carbon ("PAC"), into flue gas emitted by the boiler of a power plant. Powdered activated carbon is a porous carbonaceous material having a high surface area, which exposes significant amounts of beneficial chemically functional and catalytic reaction sites and which creates high adsorptive potential for many compounds, including capturing mercury from the flue gas. Activated carbon injection ("ACI") technology has shown the potential to control mercury emissions in most coal-fired power plants, even those plants that may achieve some mercury control through control devices designed for other pollutants, such as wet or dry scrubbers used to control sulfur dioxide and acid gases.

SUMMARY

According to the present disclosure, the capture and removal of mercury from a boiler flue gas through the injection of a sorbent can be characterized by three primary steps, which may occur sequentially or simultaneously: (1) contact of the injected sorbent with the mercury species, which is typically present in very dilute concentrations in the flue gas (e.g., <100 parts per billion); (2) conversion of elemental mercury (i.e., $Hg^0$), which is relatively inert and not easily adsorbed, into an oxidized mercury species (e.g., $Hg^+$ and/or $Hg^{+2}$), which is more readily adsorbable and is significantly more soluble in an aqueous solubilizing medium such as water; and (3) the diffusion of the oxidized mercury species into pores where it is held tightly (e.g., sequestered) without being released. The flue gas streams traverse the ductwork at very high velocities, such as in excess of 25 feet/second. Therefore, once injected, the sorbent must rapidly accomplish these three steps to contact, oxidize and sequester the mercury. In some instances, the sorbent only has a residence time of 1 to 2 seconds in the flue gas. Conventional powdered activated carbons and other similar sorbent products often do not efficiently accomplish the three required steps within such constraints.

Moreover, in high temperature environments the mercury capture performance of standard sorbents may be severely diminished. As used herein, the term "high temperature" (e.g., high temperature flue gas streams) refers to flue gas streams having a temperature near or above about 340° F. at the inlet to the particulate matter collection device. Flue gas stream temperatures near or above 340° F. at the inlet to the particulate matter collection device commonly occur in coal-fired plants with inefficient air preheaters or with hot-side electrostatic precipitators (ESPs), i.e., ESPs that are disposed upstream of an air preheater. These high temperatures may hinder mercury capture by a sorbent in several ways, including: by increasing the favorability of reverse reactions, such as the reduction of desired oxidized Hg species; by decomposition of the oxidant involved in oxidation of Hg; by desorption of Hg species from the activated carbon surface or pore structure; and/or by initiating competing reaction pathways that are not viable at lower temperatures. Further, the kinetic energy of the mercury species at elevated flue gas temperatures is increased and, for example, the kinetic energy may be described as being forty-percent higher at 600° F. than it is at 300° F. Because of these factors, the capture of mercury at high temperatures becomes more of a challenge. What is needed in the art is sorbent that efficiently captures mercury, even under high temperature conditions.

It would be advantageous to provide a novel composition of matter which overcomes the traditional limitations of conventional sorbents and may effectively act as a catalyst to oxidize mercury species to a more capturable form, as a sorbent to efficiently capture mercury and as a solvent to rapidly remove mercury from a flue gas stream, e.g., to meet governmental regulations for mercury emissions even when the flue gas stream temperatures are near 340° F. and above. In this regard, various embodiments of a composition of matter that is multi-functional are provided. These multi-functional compositions of matter may overcome the limitations of conventional sorbents in that they may be injected into a flue gas stream to efficiently and rapidly remove mercury from the flue gas stream, e.g., to meet governmental regulations for mercury emissions.

In one embodiment, a multi-functional composition of matter is provided that is particularly adapted to be injected into a high-temperature flue gas stream for the capture of mercury from the high-temperature flue gas stream. The multi-functional composition of matter may comprise at least about 20 wt. % and not greater than about 75 wt. % fixed carbon, at least about 20 wt. % and not greater than about 50 wt. % minerals, and at least about 3 wt. % and not greater than about 12 wt. % aqueous-based solubilizing medium. The multi-functional composition of matter may also have a median (D50) particle size of not greater than about 15 micron (μm), a sum of micropore volume and mesopore volume of at least about 0.20 cc/g, and a ratio of micropore volume to mesopore volume of at least about 0.7 and not greater than about 1.5. Further, the multi-functional composition of matter may have a tapped density that is at least about 0.35 g/ml and is not greater than about 0.575 g/ml.

In one characterization, the multi-functional composition of matter has a median particle size that is not greater than about 14 micron, such as not greater than about 12 micron, such as not greater than about 10 micron or even not greater than about 8 micron. In another characterization, the multi-functional composition of matter has a median particle size of at least about 5 micron. In another characterization, the sum of micropore volume plus mesopore volume in the multi-functional composition of matter is at least about 0.24 cc/g. In another characterization, the ratio of micropore volume to mesopore volume is at least about 0.9 and is not greater than about 1.5.

In another characterization, the tapped density of the multi-functional composition of matter is not greater than about 0.55 g/ml, such as not greater than about 0.51 g/ml or not greater than about 0.45 g/ml.

In yet another characterization, the nominal number of particles per gram of the multi-functional composition of matter (e.g., as calculated from the density and D50 particle size) is at least about 0.8 billion, and in another characterization is at least about 1.5 billion, such as at least about 2.5 billion particles per gram of the multi-functional composition of matter.

In another characterization, the multi-functional composition of matter when injected in a beta test at a coal-fired power plant combusting high rank coal and when the mercury emission rate (in lbs Hg/TBtu) is plotted as a function of the composition injection rate (in lbs/MMacf, i.e., pounds per one million actual cubic feet), the slope of the trendline with the highest $R^2$ value (i.e., the correlation coefficient) at 1.2 lbs Hg/TBtu will be more negative than about −0.06. In yet another characterization, a composition of matter when injected in a beta test at a coal-fired power plant combusting high rank coal and when the mercury emission rate (lb Hg/TBtu) is plotted as a function of the composition injection rate (lb/MMacf), the slope of the trendline with the highest $R^2$ value at 1.2 lbs Hg/TBtu will be more negative than about −0.12.

In another characterization, the multi-functional composition of matter when injected in a beta test at a coal-fired power plant combusting low rank coal and when the mercury emission rate (lb Hg/TBtu) is plotted as a function of the composition injection rate (lb/MMacf), the slope of the trendline with the highest $R^2$ value at 4.0 lbs Hg/TBtu will be more negative than about −1. In yet another characterization, the multi-functional composition of matter when injected in a beta test at a coal-fired power plant combusting low rank coal and when the mercury emission rate (lb Hg/TBtu) is plotted as a function of the composition injection rate (lb/MMacf), the slope of the trendline with the highest $R^2$ value at 4.0 lbs Hg/TBtu will be more negative than about −6.

In another characterization, the minerals of the multi-functional composition of matter are native to a feedstock that is used for the manufacture of the multi-functional composition of matter. In another characterization, the multi-functional composition of matter comprises of minerals from the group consisting of calcium-containing minerals, potassium-containing minerals, iron-containing minerals, silicon-containing minerals, sodium-containing minerals, tin-containing minerals, zinc-containing minerals, magnesium-containing minerals, aluminosilicate containing minerals and combinations thereof. In one particular characterization, the minerals comprise oxide minerals. In another characterization, the minerals comprise at least 1 wt. % iron-containing minerals.

In another characterization, the multi-functional composition of matter comprises at least about 3 wt. % and not greater than about 8 wt. % aqueous-based solubilizing medium.

In another characterization, the multi-functional composition of matter has a Hardgrove Grindability Index of at least about 90. In yet another characterization, the multi-functional composition of matter has a Hardgrove Grindability Index of at least about 100.

In another characterization, the multi-functional composition of matter has a mercury particle density of at least about 0.5 g/cc and not greater than about 0.9 g/cc. In another characterization, the multi-functional composition of matter has an envelope particle density of at least about 0.3 g/cc and not greater than about 1.5 g/cc. In yet another characterization, the multi-functional composition of matter has an envelope particle density of at least about 0.5 g/cc and not greater than about 1.0 g/cc.

In yet another characterization, the multi-functional composition of matter further comprises a halogen-containing compound. In one characterization, multi-functional composition of matter comprises at least about 1 wt. % and not greater than about 15 wt. % of a halogen-containing compound. In another characterization, the halogen-containing compound comprises a bromine salt.

In another embodiment, the present disclosure is directed to a method for the treatment of a high temperature flue gas stream, e.g. to remove mercury therefrom, where the temperature of the flue gas stream is at least about 340° F. at the inlet to a particulate matter control device. The method includes contacting a multi-functional composition of matter with the high temperature flue gas stream, e.g., by injecting the composition of matter into the high temperature flue gas stream, where the multi-functional composition of matter is in accordance with any of the foregoing embodiments and characteristics. Thus, in one characterization, the multi-functional composition of matter that is injected into the high temperature flue gas stream may comprise at least about 20 wt. % and not greater than about 75 wt. % fixed carbon, at least about 20 wt. % and not greater than about 50 wt. % minerals, and at least about 3 wt. % and not greater than about 12 wt. % aqueous-based solubilizing medium. The multi-functional composition of matter may also have a median (D50) particle size of not greater than about 15 micron, a sum of micropore volume and mesopore volume of at least about 0.20 cc/g, and a ratio of micropore volume to mesopore volume of at least about 0.7 and not greater than about 1.5. Further, the multi-functional composition of matter may have a tapped density that is at least about 0.35 g/ml and is not greater than about 0.575 g/ml.

In one characterization, the multi-functional composition of matter that is contacted with the high temperature flue gas stream has a median particle size that is not greater than about 14 micron, such as not greater than about 12 micron, such as not greater than about 10 micron or even not greater than about 8 micron. In another characterization, the multi-functional composition of matter that is contacted with the high temperature flue gas stream has a median particle size of at least about 5 micron. In another characterization, the sum of micropore volume plus mesopore volume in the multi-functional composition of matter is at least about 0.24 cc/g. In another characterization, the ratio of micropore volume to mesopore volume is at least about 0.9 and is not greater than about 1.5.

In another characterization, the tapped density of the multi-functional composition of matter that is contacted with the high temperature flue gas stream is not greater than about 0.55 g/ml, such as not greater than about 0.51 g/ml or not greater than about 0.45 g/ml.

In yet another characterization, the nominal number of particles per gram of the multi-functional composition of matter that is contacted with the high temperature flue gas stream is at least about 0.8 billion, and in another characterization is at least about 1.5 billion, such as at least about 2.5 billion particles per gram of the multi-functional composition of matter.

In another characterization, the minerals of the multi-functional composition of matter that is contacted with the high temperature flue gas stream are native to a feedstock that is used for the manufacture of the multi-functional composition of matter. In another characterization, the multi-functional composition of matter comprises of minerals from the group consisting of calcium-containing minerals, potassium-containing minerals, iron-containing minerals, silicon-containing minerals, sodium-containing minerals, tin-containing minerals, zinc-containing minerals, magnesium-containing minerals, aluminosilicate containing minerals and combinations thereof. In one particular characterization, the minerals comprise oxide minerals. In another characterization, the minerals comprise at least 1 wt. % iron-containing minerals.

In another characterization, the multi-functional composition of matter that is contacted with the high temperature flue gas stream comprises at least about 3 wt. % and not greater than about 8 wt. % aqueous-based solubilizing medium.

In another characterization, the multi-functional composition of matter that is contacted with the high temperature flue gas stream has a Hardgrove Grindability Index of at least about 90. In yet another characterization, the multi-functional composition of matter has a Hardgrove Grindability Index of at least about 100.

In another characterization, the multi-functional composition of matter that is contacted with the high temperature flue gas stream has a mercury particle density of at least about 0.5 g/cc and not greater than about 0.9 g/cc. In another characterization, the multi-functional composition of matter has an envelope particle density of at least about 0.3 g/cc and not greater than about 1.5 g/cc. In yet another characterization, the multi-functional composition of matter has an envelope particle density of at least about 0.5 g/cc and not greater than about 1.0 g/cc.

In yet another characterization, the multi-functional composition of matter that is contacted with the high temperature flue gas stream further comprises a halogen-containing compound. In one characterization, multi-functional composition of matter comprises at least about 1 wt. % and not greater than about 15 wt. % of a halogen-containing compound. In another characterization, the halogen-containing compound comprises a bromine salt.

In another characterization of this embodiment, the multi-functional composition of matter is injected into the flue gas stream via an array of lances.

In another characterization, the multi-functional composition of matter is collected by a particulate matter collection device with no more than a 45° F. decrease in temperature of the flue gas stream from the point of injection of the multi-functional composition of matter to the particulate matter collection device. In another characterization, the particulate matter collection device is an electrostatic precipitator. In yet another characterization, the particulate matter collection device is a fabric filter baghouse.

DETAILED DESCRIPTION

Various embodiments of a multi-functional composition of matter are provided that are particularly useful when injected into a fluid gas stream such as a flue gas stream (e.g., from a coal-burning boiler or a waste energy boiler) to rapidly and efficiently capture and remove mercury from the flue gas stream. In this regard, the multi-functional composition of matter advantageously includes several different components that synergistically may (1) increase the probability of contact with mercury species in the flue gas, (2) decrease the time required for mercury oxidation and capture (e.g., as a result of enhanced oxidation reaction kinetics and/or mass diffusional kinetics), and (3) advantageously reduce the total amount of material that must be injected to recover sufficient amounts of mercury to meet mercury removal criteria, such as applicable government regulations.

Typically operators of combustion facilities will define flue gas stream temperature as the temperature of the flue gas stream at the inlet of the particulate matter collection device. It has been unexpectedly found that the multi-functional compositions disclosed herein are particularly useful for injection into (e.g., contacting with) high temperature flue gas streams, e.g., with temperatures of about 340° F. or higher at the inlet to the particulate matter collection device. As is discussed in more detail below, facilities may require contact with the compositions at such high temperatures when a hot-side particulate matter collection device is utilized (e.g., an electrostatic precipitator that is disposed upstream of an air preheater), in the absence of an air preheater, or when the air preheater is not operating efficiently (e.g., when the air preheater does not reduce the temperature of the flue gas stream to below about 340° F.).

Figure 1:
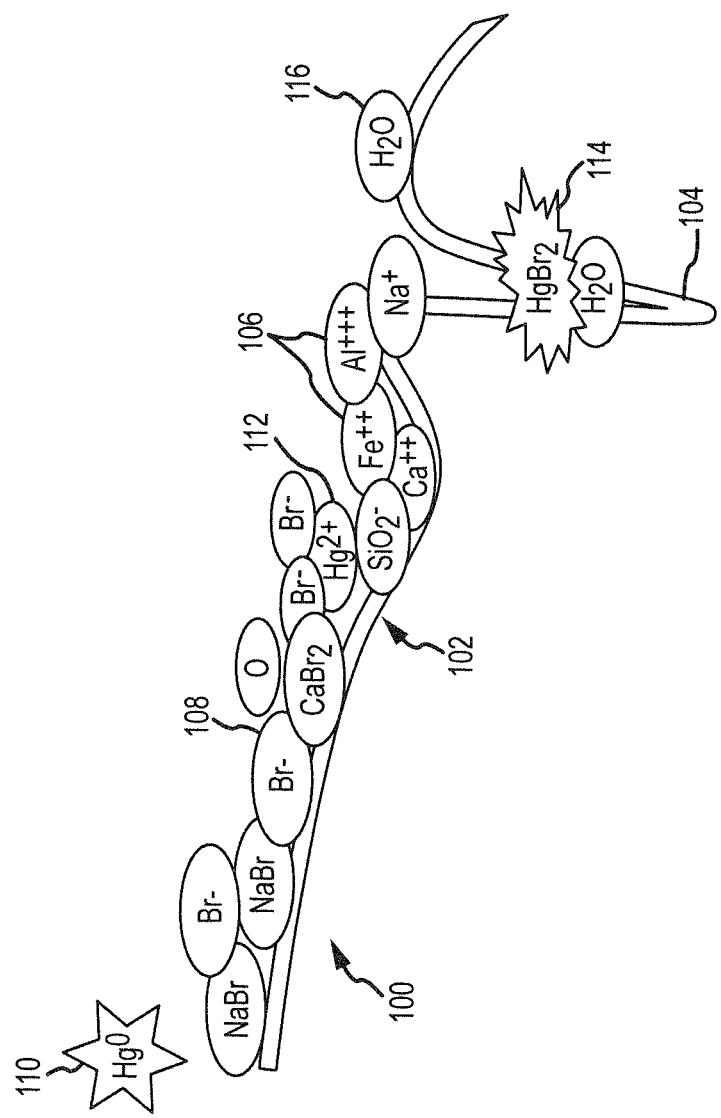
FIG. 1 schematically illustrates an example of the surface of a multi-functional composition of matter.

In this regard, the multi-functional composition of matter may include a carbonaceous material (e.g., fixed carbon), minerals, and an aqueous solubilization medium that together synergistically oxidize mercury and enhance the removal of mercury from a fluid stream, e.g., from a flue gas stream. The composition may also include a halogen, e.g., in the form of a halide salt such as bromide salt. For example, the minerals and the halogen may enhance the oxidation of elemental mercury, and the aqueous solubilizing medium (e.g., water) may solubilize the oxidized mercury and enhance mass diffusional kinetics. In addition, the multi-functional composition of matter may have various beneficial physical attributes such as a relatively small particle size and well-controlled pore size distribution. As illustrated in FIG. 1, a multi-functional composition of matter containing a synergistic combination of minerals, halogen, and carbonaceous material having a small particle size and well-controlled pore size distribution provides a relatively large surface area on which kinetic mechanisms occur, and provides a sufficient capture mechanism to rapidly and efficiently sequester mercury from boiler flue gas.

Referring to FIG. 1, the multi-functional composition of matter 100 may contain a porous carbonaceous material 102 (e.g., fixed carbon) that is adapted to provide a large surface area in the appropriate pore size for the mercury oxidation and to sequester the oxidized mercury from the flue gas stream. The multi-functional composition of matter 100 may include at least about 10 wt. % (weight percent) of fixed carbon 102, such as at least about 15 wt. % or even at least about 20 wt. % fixed carbon 102. However, it is preferred that the fixed carbon content of the multi-functional composition of matter 100 not exceed about 75 wt. %, such as not greater than about 60 wt. %, or such as not greater than about 55 wt. % fixed carbon 102. Due to a well-controlled pore structure 104 and the presence of the other components in the multi-functional composition of matter 100, a relatively low amount of fixed carbon 102 is required for mercury oxidation and sequestration (e.g., a low amount of fixed carbon per unit volume of the flue gas stream) as compared to typical sorbent compositions.

In one aspect, the multi-functional composition of matter 100 may have a relatively small average particle size (e.g., median particle size, also known in the art as D50), particularly as compared to typical sorbent compositions used for activated carbon injection. In this regard, the multi-functional composition of matter 100 may have a median particle size not greater than about 15 micron, not greater than about 14 micron, such as not greater than about 12 micron, not greater than about 10 micron and even not greater than about 8 micron. In another characterization, the multi-functional composition of matter 100 may have a median particle size of at least about 5 micron, such as at least about 6 micron. The D50 median particle size may be measured using techniques such as light scattering techniques (e.g., using a Saturn DigiSizer II, available from Micromeritics Instrument Corporation, Norcross, Ga.). A relatively small median particle size, such as not greater than about 15 micron, means greater surface area per volume of the multi-functional composition. The increased surface area results in many benefits, including, but not limited to, increased exposure of the mercury to minerals and halogen, increased area available for reactions to occur, and thus overall improved reaction kinetics.

The multi-functional composition of matter 100 may also have a high pore volume and a well-controlled distribution of the pores 104, particularly among the mesopores (i.e., from 20 Å to 500 Å width) and the micropores (i.e., not greater than 20 Å width). It has been found that a well-controlled distribution of micropores and mesopores is desirable for effective removal of mercury from the flue gas stream. In this regard, while not wishing to be bound by any theory, it is believed that the mesopores are the predominant structures for capture and transport of the oxidized mercury species to the micropores, whereas micropores are the predominate structures for sequestration of the oxidized mercury species.

In this regard, the sum of micropore volume plus mesopore volume of the multi-functional composition of matter 100 may be at least about 0.10 cc/g, such as at least 0.20 cc/g, at least about 0.24 cc/g or even at least about 0.25 cc/g. The micropore volume of the multi-functional composition of matter 100 may be at least about 0.05 cc/g, such as at least about 0.13 cc/g. Further, the mesopore volume of the multi-functional composition of matter 100 may be at least about 0.05 cc/g, such as at least about 0.13 cc/g. In one characterization, the ratio of micropore volume to mesopore volume may be at least about 0.7, such as at least about 0.9, and may be not greater than about 1.5. Such levels of micropore volume relative to mesopore volume advantageously enable efficient capture and sequestration of oxidized mercury species, such as $HgBr_2$, by the multi-functional composition of matter 100. Pore volumes may be measured using gas adsorption techniques (e.g., $N_2$ adsorption) using instruments such as a TriStar II Surface Area Analyzer (Micromeritics Instruments Corporation, Norcross, Ga., USA).

The multi-functional composition of matter 100 may also be characterized by having a well-controlled particle density. Particle density is the mass of the particle over the volume of the particle (excluding pore volume of larger pores that do not contribute to adsorption), and is typically measured in grams per cubic centimeter (g/cc). Particle density correlates to the surface area to volume ratio of the multi-functional composition of matter, which in turn affect mercury capture performance. Two methods of measuring particle density are described below.

Particle density can be measured by liquid mercury volume displacement, in which case the result is referred to as the mercury particle density. In this regard, the multi-functional composition of matter 100 may have a mercury particle density of at least about 0.5 g/cc, such as at least about 0.6 g/cc. Conversely, the mercury particle density of the multi-functional composition of matter may be not greater than about 0.9 g/cc, such as not greater than about 0.8 g/cc. Mercury particle density may be measured by the Micromeritics AccuPyc Pycnometer (Micromeritics Inc., Norcross, Ga., USA).

Particle density can also be measured by sedimentary volume displacement, in which case the result is referred to as the envelope particle density. In this regard, the envelope particle density of the multi-functional composition of matter 100 may be at least about 0.3 g/cc, such as at least about 0.5 g/cc or at least about 0.6 g/cc. The envelope particle density of the multi-functional composition of matter 100 may be not greater than about 1.5 g/cc, such as not greater than about 1.0 g/cc. Envelope particle density may be measured using a Micromeritics GeoPyc Envelope Density Analyzer (Micrometrics, Inc., Norcross, Ga., USA).

The multi-functional composition of matter may also be characterized as having a well-controlled tapped density. Density may be measured in various ways and typically bulk density is used to describe powders and granules or other masses of particulate matter. Bulk density, however, is not an intrinsic property of a material, being that it may change depending on how the material is handled. For example, a powder poured into a cylinder will have a particular bulk density. If the cylinder is disturbed, the powder particles will move and usually settle closer together, resulting in a lower volume and a higher bulk density. For this reason, the bulk density of powders may be reported both as "freely settled" (or "poured" density) and "tapped" density, where the tapped density refers to the bulk density of the powder after a specified compaction process, usually involving vibration of the container. Tapped density may be measured using an ETD-1020 tap density tester available from Electrolab (Mumbai, India), for example. The USP II method may be used where a test volume is weighed in a container, which is then "tapped" until the volume does not change and the tapped density is calculated. The tapped density of the multi-functional composition of matter disclosed herein may be not greater than about 0.6 grams per milliliter (g/ml), such as not greater than about 0.575 g/ml, not greater than about 0.55 g/ml, not greater than about 0.51 g/ml, or even not greater than about 0.45 g/ml. Typically, the tapped density of the multi-functional composition of matter will be at least about 0.35 g/ml, such as at least about 0.4 g/ml.

Further, the multi-functional composition of matter 100 may be characterized with respect to the number of particles in a given mass. As such the nominal number of particles in a gram of matter can be determined from the median (D50) particle size and the particle density, i.e., apparent density as measured by the Pechiney mercury density test. Assuming a spherical geometry for the particles, a particle density, $d_p$, of 0.7 g/cc, and a monodisperse distribution about the D50, the nominal number of particles per gram can be calculated for a given particle size according to the equation below:

Number of particles per gram=$1/(d_p)(v_p)$

Where $v_p$, the volume of the particle, is equal to $4/3\pi r^3$, where r is the radius of the particle in cm calculated by dividing the D50 by 2. Applying the foregoing calculation, the number of particles per gram of the multi-functional composition of matter is calculated and presented in Table 1 below.

TABLE 1

| D50 Size (um) | Number of Particles per gram |
|---|---|
| 5 | 21,826,982,060 |
| 8 | 5,328,853,042 |
| 10 | 2,728,372,758 |
| 12 | 1,578,919,420 |
| 14 | 994,304,941 |
| 15 | 808,406,743 |
| 20 | 341,046,595 |
| 25 | 174,615,856 |

Another component of the multi-functional composition of matter 100 is minerals 106. In one characterization, such minerals 106 may be native to the feedstock from which the carbonaceous material is formed (e.g., by activation). In another characterization, some portion of the minerals 106 may be separately added to the multi-functional composition of matter, which requires additional expenses. While not wishing to be bound by any theory, it is believed that such minerals 106 may advantageously facilitate the oxidation of the elemental mercury in the flue gas stream. The presence of such minerals 106 may thereby enhance the kinetics of the mercury oxidation such that a reduced contact time with the flue gas stream is required to oxidize and remove sufficient amounts of mercury from the flue gas stream as compared to sorbents without such minerals.

The minerals 106 may advantageously be comprised of minerals including, but not limited to, aluminum-containing minerals, calcium-containing minerals, iron-containing minerals, silicon-containing minerals, sodium-containing minerals, potassium-containing minerals, zinc-containing minerals, tin-containing minerals, magnesium-containing minerals, and combinations thereof. The minerals may predominantly be oxide-based minerals, such as metal oxide minerals (e.g., CaO, $Fe_2O_3$, $Fe_3O_4$, FeO, $Al_2O_3$), and silicates (e.g., $Al_2SiO_5$). In one characterization, the minerals 106 predominantly include metal oxides, particularly aluminum oxides and iron oxides. In another characterization, the minerals 106 include calcium-containing minerals, iron-containing minerals and aluminosilicates. These types of minerals are particularly well adapted to catalyze the oxidation reaction of the mercury. Iron-containing minerals are particularly well adapted to catalyze the oxidation reaction, and in one characterization, the minerals include at least 1 wt. % iron-containing minerals. The minerals 106 may be intimately intertwined within the multi-functional composition of matter within a well-controlled porous structure that facilitates the oxidation, capture and removal of mercury.

To provide sufficient reaction activity and rapid oxidation kinetics, the multi-functional composition of matter 100 may include at least about 20 wt. % of the minerals, such as at least 25 wt. % and even at least about 30 wt. % of the minerals. However, excessive amounts of the minerals 106 in the multi-functional composition of matter 100 may be detrimental to the capture of mercury. In this regard, the multi-functional composition of matter 100 may include not greater than about 50 wt. % of the minerals, such as not greater than about 45 wt. %. Advantageously, the multi-functional composition of matter may include not greater than about 40 wt. % of the minerals, such as not greater than about 35 wt. %. The total mineral content may be measured by a TGA701 Thermogravitmetric Analyzer (LECO Corporation, St. Joseph, Mich.). The specific types and amount of particular minerals may be measured by the Niton XL3t X-Ray Fluorescence (XRF) Analyzer (Thermo Fisher Scientific Inc., Waltham, Mass.).

The multi-functional composition of matter 100 may also include a halogen 108, e.g., a halogen-containing compound such as a bromine salt. Halogens by themselves are not known to be oxidants for mercury, but are a vital reaction participant in the oxidation of mercury. The multi-functional composition of matter 100 may include at least about 1 wt. % of the halogen 108, such as at least 2 wt. % or even at least about 5 wt. % of the halogen 108. Significantly increased amounts of the halogen 108 may be detrimental to mercury capture and sequestration, and also can contribute to equipment corrosion and excessive bromine emissions in downstream liquid and gas streams, which may require further treatment processes. Therefore, the active halogen content of the multi-functional composition of matter may advantageously not exceed about 15 wt. %, such as not greater than about 10 wt. %. In one particular characterization, the multi-functional composition of matter comprises at least about 1 wt. % and not greater than about 15 wt. % of a halogen-containing compound, such as a bromine salt.

The accessibility of the halogen 108 (e.g., Br) may be very high in order to facilitate mercury oxidation. In this regard, the halogen deposits may have primarily colloidal dimensions rather than granular dimensions. For example, these halogen deposits may have a mean width of at least about 0.5 micron and not greater than about 2.0 micron (in colloidal dimensions, as determined by Scanning Electron Microscopy (SEM) and Energy Dispersive Spectroscopy (EDS), as opposed to individual molecular dimensions). As stated above, the halogen 108 is not by itself an oxidant but can participate as a reactant and therefore enhance the oxidation of mercury. In this regard, while not wishing to be bound by any theory, it is believed that the halogen 108 and the other features of the multi-functional composition of matter 100 synergistically enhance the oxidation of elemental mercury (Hg°) to oxidized mercury ($Hg^{2+}$) 112, particularly in the aqueous solubilization conditions (e.g., high moisture flue gas conditions). It is believed that such a combination precludes the need to treat the multi-functional composition of matter with a more expensive and corrosive form of bromine (for example $Br_2$).

Figure 2:
FIG. 2 illustrates an image of colloidal bromide salt on the surfaces of multi-functional composition of matter taken by Scanning Electron Microscopy coupled with Energy Dispersive Spectrometry.

Thus, as illustrated in FIG. 2, the halogen may advantageously be dispersed throughout the multi-functional composition of matter in a colloidal fashion, particularly on the composition's surfaces which are in contact with the flue gas, e.g., as determined by SEM with EDS. SEM images the composition while EDS enables the identification of the location of specific elements. Providing a highly dispersed halogen facilitates rapid reaction kinetics. This dispersion reflects a favorable approach to an application of halogens to the multi-functional composition of matter. The halogen is more effective when accessible and well-dispersed (i.e., not in clumps or as a solid mix in the form of separate particles). In one characterization, when the multi-functional composition of matter is analyzed by SEM and EDS at a magnification of 12,000 times over at least a 20 micron by 10 micron image area, the pixels attributed to the halogen (e.g., using EDS) may exhibit a mean width of at least about 0.05 micron and not greater than about 2 micron, wherein the overall pixel area attributed to the halogen represents at least about 3% of this overall image area, for example at least about 10% of the overall image area, or even at least about 20% of the overall image area. In a further characterization as illustrated in FIG. 2, when the composition of matter is analyzed by SEM and EDS at a magnification of 12,000 times over at least a 20 micron by 15 micron image area, the pixels attributed to the halogen appear in at least 20% of the pixel area in any 10 micron by 10 micron scanning area.

In addition to the foregoing, the multi-functional composition of matter has additional beneficial surface chemistry characteristics. For example, flue gas is typically acidic. When sequestering metals like mercury in such an environment, it is advantageous to solubilize the metal prior to capture, which often requires specific ionic conditions. Thus, the multi-functional composition of matter may have a pH of the surface greater than pH 8 and not greater than about pH 12.

Moreover, and referring back to FIG. 1, the multi-functional composition of matter 100 may also include an amount of aqueous-based solubilizing medium such as water 116. Such aqueous-based solubilizing medium can combat the acidity of the flue gas, enhance the mass diffusional kinetics of mercury oxidation and sequestration reactions by solubilizing oxidized mercury species within the pore structure, and prevent captured mercury from re-solubilizing and reentering the flue gas. In this regard, the multi-functional composition of matter may include at least about 2 wt. % of the solubilizing medium, such as at least about 3 wt. % or at least about 6 wt. %. However, the amount of solubilizing medium in the multi-functional composition of matter should be not greater than about 12 wt. %, such as not greater than about 10 wt. % or even not greater than about 8 wt. % to avoid interfering with the mercury oxidation reaction(s) and consuming carbon adsorption capacity.

While not wishing to be bound by any particular theory, FIG. 1 schematically illustrates the mechanisms that are believed to be responsible for the rapid oxidation and sequestration of mercury from a flue gas stream using the multi-functional compositions of matter disclosed herein. The fixed carbon 102 provides a large surface area for the elemental mercury 110 to react with the (optional) halogen 108, minerals 106, and other components of the multi-functional composition of matter 100. The minerals 106 that are in close proximity with other redox agents on or near the surface advantageously catalyze, oxidize, enhance, and/or otherwise facilitate the oxidation of the mercury and the formation of oxidized mercury species 112 such as $Hg^{+2}$, which can bond with the halogen to form such species as $HgBr_2$ 114. The presence of aqueous-based solubilizing medium on the multi-functional composition of matter (e.g., water 116) facilitates the redox activity, the transport of these mercury species 114 within the pore structure 104, and the solubilization of these mercury species 114 within the pore structure 104 to sequester the mercury species 114 therein. As a result, the mercury oxidation kinetics and the mass diffusional kinetics are enhanced to enable the rapid and efficient oxidation and sequestration of mercury by the multi-functional composition of matter 100.

The enhanced reaction and diffusional kinetics of the multi-functional composition of matter may enable coal-burning facilities (e.g., a coal-fired power plant) to rapidly and efficiently capture mercury to meet regulatory limits on mercury emissions. For example, the U.S. EPA Mercury Air Toxic Standards (MATS) set mercury emission limits based on the amount of mercury per amount of power produced of 1.2 lb Hg/TBtu for coal-fired power plants combusting high rank coals (i.e., coals having >8,300 Btu/lb) and of 4.0 lb Hg/TBtu for facilities combusting low rank coals (i.e., coals having <=8,300 Btu/lb).

Figure 3:
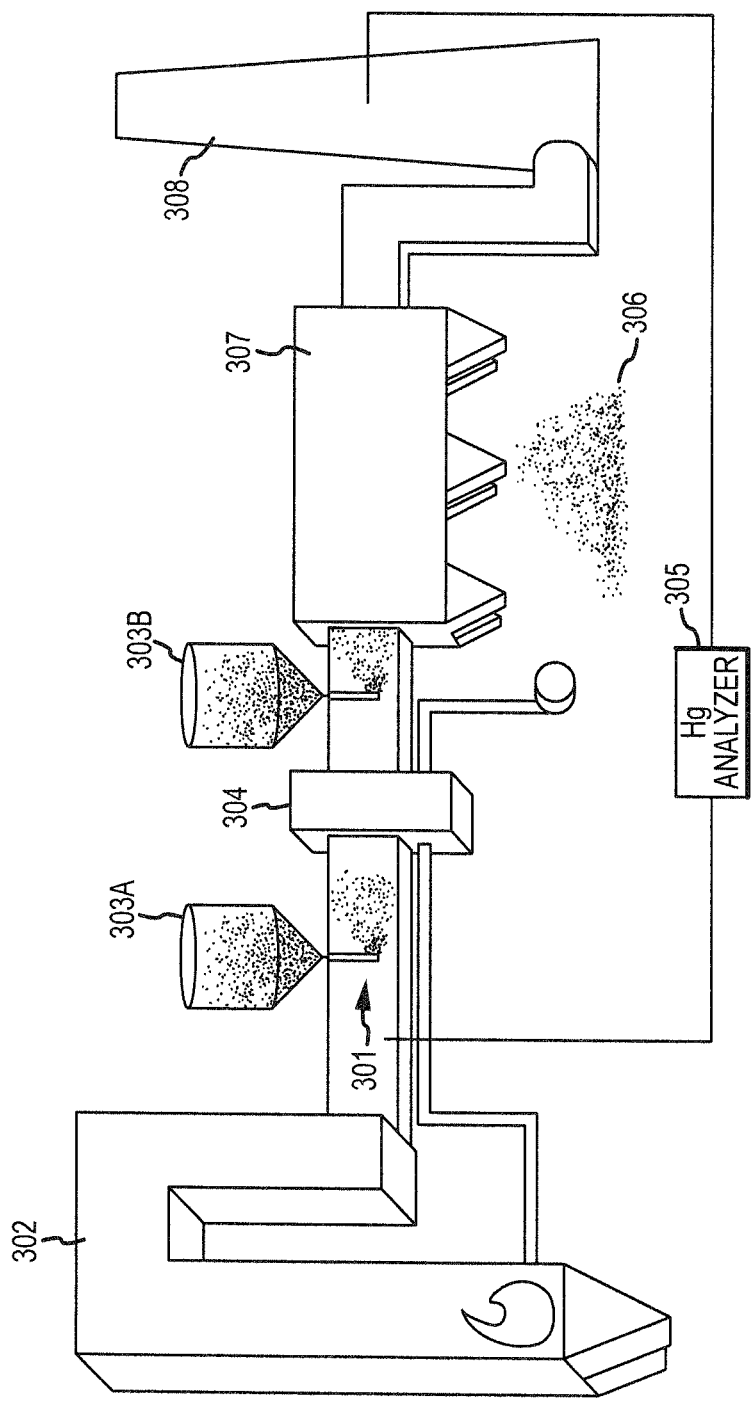
FIG. 3 schematically illustrates a sample plant configuration and method for the capture and sequestration of mercury from a flue gas stream.

FIG. 3 schematically illustrates a system and method for removal of mercury from a flue gas stream produced by a coal-burning power plant using activated sorbent injection to contact the multi-functional composition of matter with the flue gas stream. The flue gas stream 301 exits a boiler 302 where coal has been combusted. The flue gas stream as it exits the boiler typically has a temperature of from about 600° F. to about 900° F. As illustrated in FIG. 3, the flue gas stream 301 may then proceed to an air preheater unit 304 where the temperature of the flue gas stream 301 is reduced, generally to about 325° F. However, if the air preheater unit 304 is not operating efficiently, or there is no air preheater unit, as is frequently the case at industrial boiler sites, the flue gas stream temperature may exceed 325° F., e.g., being at or above about 340° F., being even as high as about 600° F. at the entrance to the particulate matter collection device.

After the air preheater unit 304, the flue gas stream 301 may be introduced to a particulate matter collection device 307 such as an electrostatic precipitator (ESP) or a fabric filter bag house which removes particulate matter from the flue gas stream 301, before exiting out a stack 308. For example, a cold-side (i.e., after the air preheater unit) electrostatic precipitator can be used. It will be appreciated by those skilled in the art that the plant may include other devices not illustrated in FIG. 3, such as a selective catalytic reduction unit (SCR) and the like, and may have numerous other configurations. In order to capture mercury from the flue gas stream 301, the multi-functional composition of matter may be introduced to (e.g., injected into) and contacted with the flue gas stream 301 either before 303A or after 303B the air preheater unit 304, but before the particulate matter collection device 307 which will remove it from the flue gas stream 301.

As is discussed above, the composition disclosed herein may be injected into the flue gas stream 301 before the air preheater unit 304. In this case, the temperature of the flue gas stream 301 at the initial point of contact with the composition of matter will be relatively high, such as from about 600° F. to about 900° F., or higher In one configuration, the particulate matter collection device 307 is disposed upstream of the air preheater unit 304 and the composition is initially contacted with the flue gas stream 301 upstream of the particulate matter collection device 307. In this arrangement, or in cases where there is no air preheater unit 304 or the air preheater unit is not operating efficiently the temperature of the flue gas stream 301 will be very high (e.g., from about 340° F. to about 600° F.) and the temperature of the flue gas stream 301 will decrease very little between the injection point and the particulate matter collection device 307. In one characterization, the temperature of the flue gas stream 301 will drop by not greater than about 45° F., such as by not greater than about 30° F., between the injection point where the composition of matter is injected and the particulate matter collection device 307, e.g., the inlet to the particulate matter collection device 307.

The nature of the multi-functional composition of matter may advantageously enable a diminished amount of the multi-functional composition of matter to be injected into the flue gas stream to obtain high mercury removal rates as compared to typical sorbent compositions. The amount of multi-functional composition of matter required to remove mercury from the flue gas stream will vary depending upon the composition of the coal and process emission control steps. Therefore, it is advantageous to define a percent removal of mercury from the coal or fuel burned in the boiler, as percent removed in pounds of mercury per trillion BTU of fuel calorimetric heating value (lb Hg/TBtu) from coal as measured at the plant stack 308 in accordance with US EPA MATS methodologies. The ability to capture high levels of mercury while injecting less sorbent may advantageously reduce material cost to the power plant operator.

While the particulate matter collection device 307 may be selected from a number of devices, including an ESP or a fabric filter bag house, the multi-functional composition of matter disclosed herein is particularly useful for removing mercury from the flue gas stream 301 when an ESP is utilized as the particulate matter collection device 307. For example, the particulate matter collection device 307 can be a cold-side ESP. While ESP units generally have a lower capital cost than a fabric filter bag house unit, fabric filter bag house units are often utilized to increase the contact time between the sorbent composition and the flue gas stream because the unit traps the sorbent and the flue gas continues to pass through the sorbent on the filter until the filter is rapped to remove the sorbent and other trapped materials. Such resident times are often deemed necessary to adequately capture mercury from the flue gas stream with temperatures of less than 350° F. However, utilizing the multi-functional composition of matter disclosed herein, which provides rapid kinetics for the oxidation reaction and mass diffusion of mercury species, even very short residence times (e.g., the contact times) between the flue gas stream and the multi-functional composition of matter may be sufficient to remove at least about 85% of the mercury from the flue gas stream, such as at least about 90% of the mercury. In this regard, the residence time may be not greater than about 5 seconds, such as not greater than about 3 seconds or even not greater than about 1 second.

Figure 4:
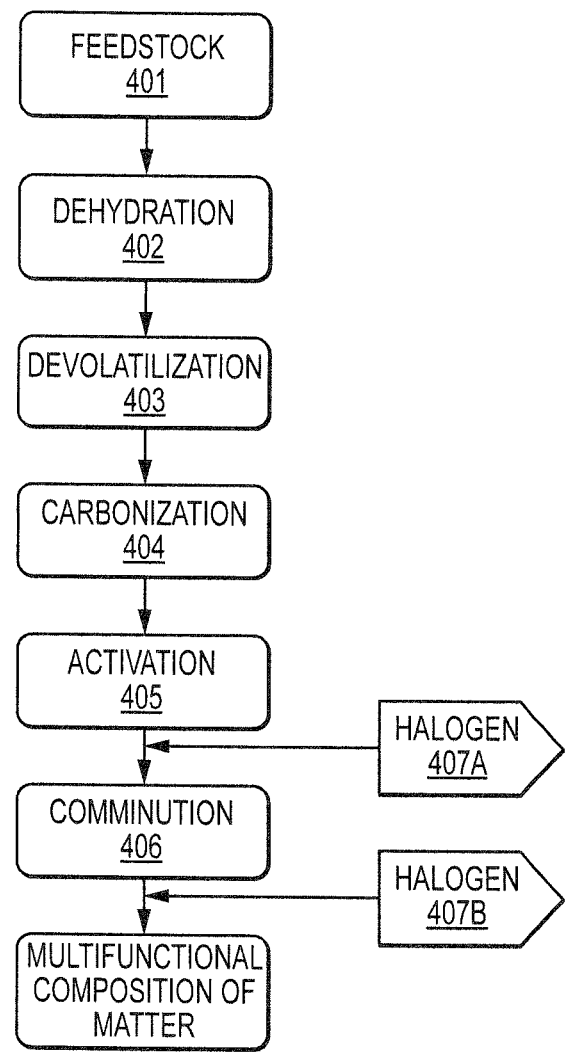
FIG. 4 illustrates a flow sheet for the manufacture of a multi-functional composition of matter.

FIG. 4 is a flow sheet that illustrates an exemplary method for the manufacture of a multi-functional composition of matter in accordance with one embodiment. The manufacturing process begins with a carbonaceous feedstock 401 such as low-rank lignite coal with a relatively high content of natural deposits of native minerals. In the manufacturing process, the feedstock is subjected to an elevated temperature and one or more oxidizing gases under exothermic conditions for a period of time to sufficiently increase surface area, create porosity, alter surface chemistry, and expose and exfoliate native minerals previously contained within feedstock. The specific steps in the process include: (1) dehydration 402, where the feedstock is heated to remove the free and bound water, typically occurring at temperatures ranging from 100-150° C.; (2) devolatilization 403, where free and weakly bound volatile organic constituents are removed, typically occurring at temperatures above 150° C.; (3) carbonization 404, where non-carbon elements continue to be removed and elemental carbon is concentrated and transformed into random amorphous structures, typically occurring at temperatures around 350° C. to 800° C.; and (4) activation 405, where steam, air or other oxidizing agent is added and pores are developed, typically occurring at temperatures above 800° C. The manufacturing process may be carried out, for example, in a multi-hearth or rotary furnace. The manufacturing process is not discrete and steps can overlap and use various temperatures, gases and residence times within the ranges of each step to promote desired surface chemistry and physical characteristics of the manufactured product.

After activation 405, the product may be subjected to a comminution step 406 to reduce the particle size (e.g., the median particle size) of the product. Comminution 406 may occur, for example, in a mill such as a roll mill, jet mill or other like process. Comminution 406 may be carried out for a time sufficient to reduce the median particle size of the thermally treated product to not greater than about 15 micron, such as not greater than about 12 micron.

Advantageously, the multi-functional composition of matter may have a relatively high Hardgrove Grindability Index (HGI), as measured by ASTM Method D409. The HGI was developed to empirically measure the relative difficulty of grinding coal to the particle size necessary for complete combustion in a coal boiler furnace. The use of HGI has been extended to grinding coal for other purposes such as iron-making, cement manufacture and chemical industries utilizing coal. Particulate materials of low value HGI are more difficult to grind than those with high values. Mill capacity also falls when grinding materials with a lower HGI. In this regard, the HGI of the multi-functional composition of matter may be at least about 80 such as at least about 90, at least about 100 or even at least about 110. The relatively high HGI enables the average particle size to be reduced with relatively low energy consumption. Further, the relatively soft materials of the multi-functional composition of matter will lead to reduced erosion (e.g., attrition) of the comminuting equipment as compared to harder materials. While not wishing to be bound by any theory, it has been observed that utilizing lignite matter feedstock will lead to a relatively high HGI.

The optional halogen may be added to the product at any stage after the activation process. For example, as illustrated in FIG. 4, halogen may be introduced either before 407A or after 407B comminution. The halogen may be introduced as a dry or wet halide salt, for example.

EXAMPLES

A beta test is a full-scale evaluation of the ability of an emission control technology at an EGU or industrial boiler to remove mercury from the flue gas. The first step is to establish baseline mercury emissions using a methodology certified by the US EPA, specifically either Method 30A (Determination of Total Vapor Phase Mercury Emissions from Stationary Sources (Instrumental Analyzer Procedure)) or Method 30B (Determination of Total Vapor Phase Mercury Emissions From Coal-Fired Combustion Sources Using Carbon Sorbent Traps), each available in 40 CFR Part 60 Appendix A-8 to Part 60. Method 30A describes the use of a mercury continuous emission monitoring systems (Hg CEMs) (e.g., manufactured by Thermo Fisher Scientific Inc. of Waltham, Mass.), while Method 30B describes testing using sorbent traps (e.g., manufactured by Ohio Lumex Co. of Twinsburg, Ohio). If Method 30A is used, then mercury emissions are measured after a relatively steady-state of mercury emissions are achieved over at least a one-hour period based on a time-weighted average measurement. If Method 30B is used, mercury emissions are calculated based on: (1) mercury captured in at least three pair of traps placed into the flue gas stream once the desired testing conditions are in a steady state; and (2) the average air emissions rate from the unit being tested, which can be measured at the stack. Method 30B specifies quality procedures for the sorbent traps.

Once the baseline is established, the sorbent is injected into the flue gas at the desired rate and the mercury emissions are measured once a steady state of mercury emissions is achieved, typically after 15 minutes or so. This process is repeated for each sorbent at each desired injection rate under each desired operating condition. Typically, injection rates are varied beginning with a rate that is anticipated to not achieve EPA mercury emission limits (such as 0.5 lb/MMacf or lower) to a rate that is expected to achieve or exceed the EPA mercury emission limits (such as 4.0 lb/MMacf, 5.0 lb/MMacf, or more). The amount of sorbent necessary to properly perform a beta test will depend on the desired injection rates, the conditions of the unit being tested, and the length of test, utilizing EPA methodology. Minimum testing requirements can be estimated based on the heat rate of the coal being burned (e.g., BTU per MW), the MW of the unit, the actual cubic feet of flow of flue gas, and the estimated time required to properly complete testing.

Operating conditions for each injection scenario should be recorded, including, but not limited to, load, coal type, emission control equipment and configuration, as well as any available temperatures. Examples 1 to 3 below illustrate the use of the multi-functional compositions of matter at temperatures greater than about 340° F. Sites operating with flue gas streams with temperatures ranging from about 340° F. and above may be referred to as high temperature units. Testing should be conducted at full load of the unit, and additional testing at reduced loads can be performed if desired. In addition, if the unit uses various coal types in the combustion process then additional testing should be done with the various coals. The specific order and types of emission control devices should be recorded along with other operating conditions. The injection rate at the EPA MATS mercury emissions limit correlates approximately to the amount of sorbent that must be injected to achieve regulatory compliance under a given set of operating conditions.

Each boiler site or power plant has unique power production capacity, coal feedstock, emissions control equipment, plant configurations, operating temperature and other conditions, and a variety of other factors. See above discussion of FIG. 3. Variability in these factors can cause mercury capture performance of the multi-functional composition of matter to vary from plant to plant. Thus, an informative way to compare the effectiveness of various compositions of matter to capture mercury is to compare the composition's mercury emissions rate (measured as lb Hg/TBtu or $\mu g/m^3$, the lb Hg/TBtu and $\mu g/m^3$ values being approximately equivalent, varying as little as 1.08×, depending on conditions) as a function of the amount of matter injected (lb/MMacf) with a standard commercially available product under similar conditions at each plant. Standard commercially available products include PowerPAC Premium® and PowerPAC Premium® Plus (ADA Carbon Solutions, LLC, Littleton, Colo.); DARCO® Hg-LH (Cabot Norit Americas Inc., Marshall, Tex.); FLUEPAC®-MC Plus (Calgon Corporation, Pittsburgh, Pa.); and B-PAC™ (Albermarle Corporation, Baton Rouge, La.).

In the event that the beta testing results in at least 4 data points (including the baseline), the data can be plotted and fitted with a trendline function of the best fit, as dictated by the highest $R^2$ value. The trendline (e.g., curve) is typically a non-linear function such as power, logarithmic, or an exponential function. The slope of this trendline at the regulatory compliance limit can be calculated as the tangent (slope) of the curve at that point. This slope gives an indication of a sorbent's potential rate of mercury oxidation and potential for additional mercury removal. Particularly, sorbents with a steeper and more negative slope are believed to have enhanced reaction kinetics that can result in much greater rates of mercury capture. Results of three beta tests are presented below.

Example 1

Example 1 illustrates the ability of a multi-functional composition of matter disclosed herein to remove mercury from the flue gas stream of a steam boiler station under high temperature conditions, e.g., at temperatures of about 340° F. or higher, namely temperatures between about 480° F. and about 500° F. as measured at the ESP inlet. The example composition, Sample A, has a median particle size of about 10 micron, a fixed carbon content between about 60 and 65 wt. %, a mineral content of about 25 wt. %, a sum of mesopore volume plus micropore volume of about 0.25 cc/g, a micropore to mesopore ratio of 1.3, a bromine salt concentration of about 5.6 wt. %, and a tapped density of about 0.54 g/ml.

Figure 5:
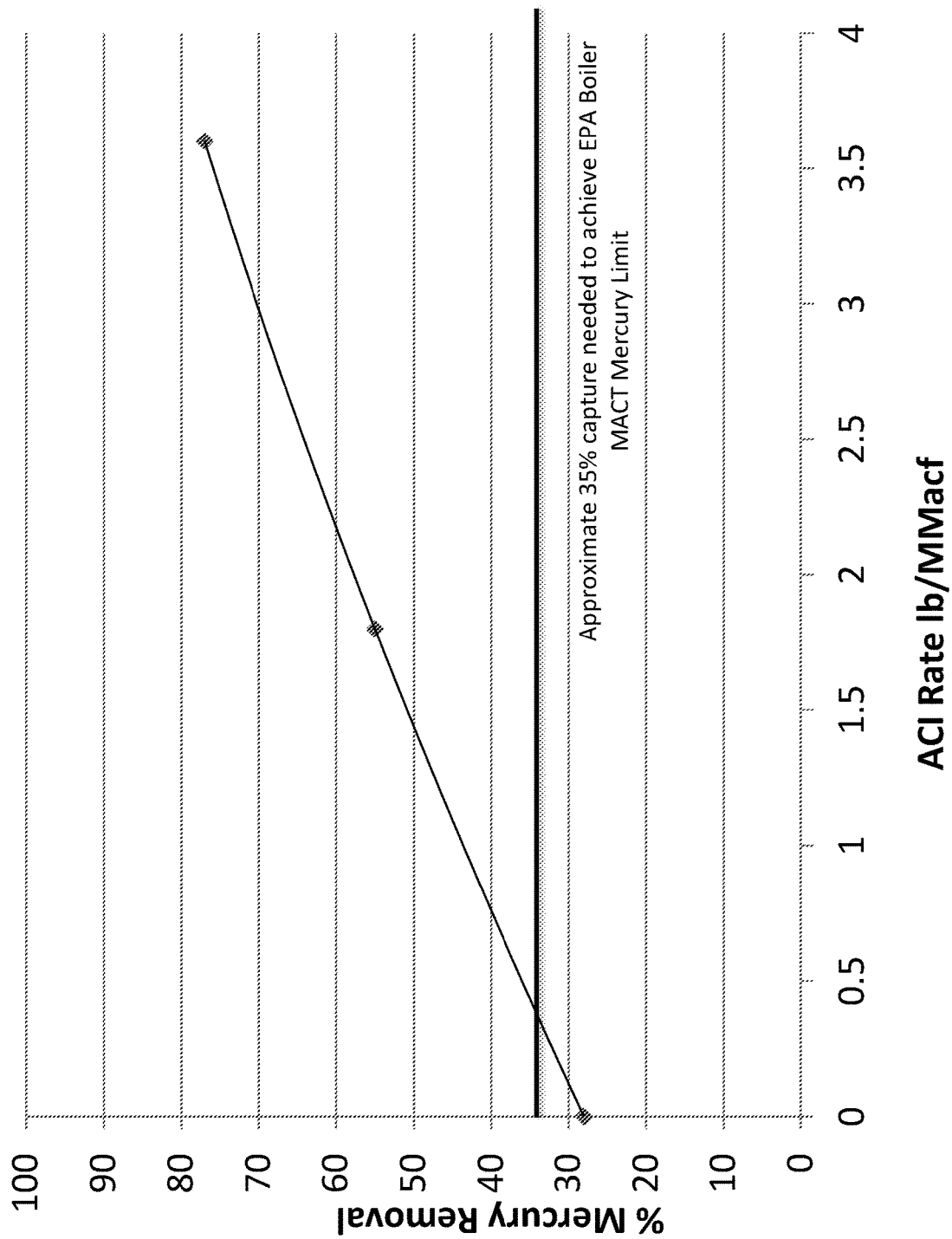
FIG. 5 illustrates mercury removal as a function of sorbent injection rate at a 30 MW industrial boiler site burning high rank bituminous coal with a flue gas stream having temperatures ranging between 480° F. and 500° F.

Sample A is injected into a flue gas stream emanating from an approximately 30 MW steam boiler station combusting a high rank bituminous coal containing 1% sulfur, where the particulate matter collection device is an ESP. A mercury (Hg) CEMS measures mercury levels before sorbent injection and also in the stack to assess mercury removal efficacy of the sample composition. The flue gas stream temperature, measured at the ESP inlet, ranges between 480° F. and 500° F. FIG. 5 illustrates the percent mercury removed by the Sample A composition at increasing injection rates. At this site, a 35% capture of mercury (Hg) removal is needed to achieve the EPA Boiler Maximum Achievable Control Technology or 'MACT' mercury limit. As indicated in FIG. 5, Sample A advantageously achieves mercury compliance levels at a sample injection rate of about 0.5 lb/MMacf.

Example 2

Figure 6:
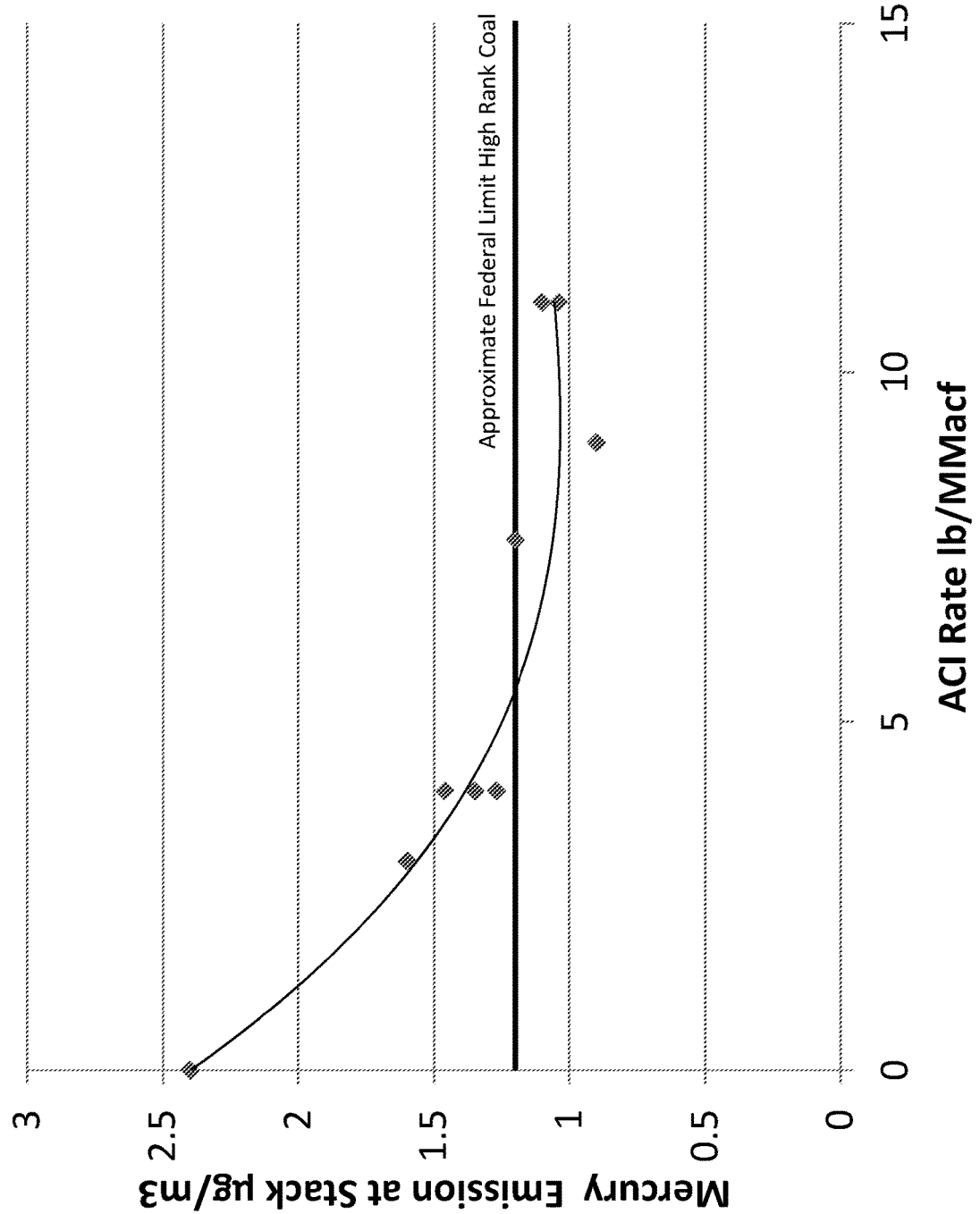
FIG. 6 illustrates the mercury concentration remaining in a flue gas stream as a function of sorbent injection rate at a 325 MW unit burning a high rank coal (Illinois Basin coal) with flue gas temperatures near 350° F.

Example 2 illustrates the ability of a multi-functional composition disclosed herein, Sample B, to treat flue gas to meet mercury emission standards under high temperature conditions. Sample B has a median particle size of about 9 micron, a fixed carbon content between about 60 and 65 wt. %, a mineral content of about 23 wt. %, a sum of mesopore volume plus micropore volume of about 0.26 cc/g, a micropore to mesopore ratio of about 1.4, a bromine salt concentration of about 5.5 wt. % and a tapped density of about 0.57 g/ml. In this flue gas treatment system, that serves a nominal 325 MW unit burning a high rank Illinois Basin (IB) coal, the flue gas travels through a SCR, APH, ESP, then a wet-Flue Gas Desulfurization (wFGD) unit and exits out a stack. The temperature of the flue gas stream is an average of 350° F. being taken at the ESP outlet. One would expect some cooling to occur in the ESP such that temperatures at the inlet exceed 350° F. FIG. 6 shows mercury remaining in the flue gas stream after sample injection as a function of sample injection rate measured at the stack using Hg CEMS. The Sample B composition is able to remove mercury, such that the federal limit of 1.2 lbs Hg/TBtu (approximately equal to 1.2 μg/m$^3$) is met at an injection rate of about 6 lb/MMacf. The trendline has a slope at the compliance limit of approximately −0.127.

Example 3

Example 3 illustrates the ability of a multi-functional composition of matter disclosed herein, Sample C, to treat flue gas to meet mercury emission standards under high temperature conditions. Testing takes place in a 1 MW slipstream of an approximately 300 MW unit burning a low rank lignite coal. Flue gas stream temperatures are near 350° F. at the point of contact with the sample. In this slipstream the flue gas temperature remains fairly constant between slipstream entrance and exit points. The Sample C composition has a median particle size of about 10 micron, has a fixed carbon content of about 50 wt. %, mineral content of about 37 wt. %, a sum of mesopore volume plus micropore volume of about 0.25 cc/g, a micropore to mesopore ratio of about 0.95, a bromine salt content of about 6.6 wt. %, and a tapped density of about 0.45 g/ml.

Figure 7:
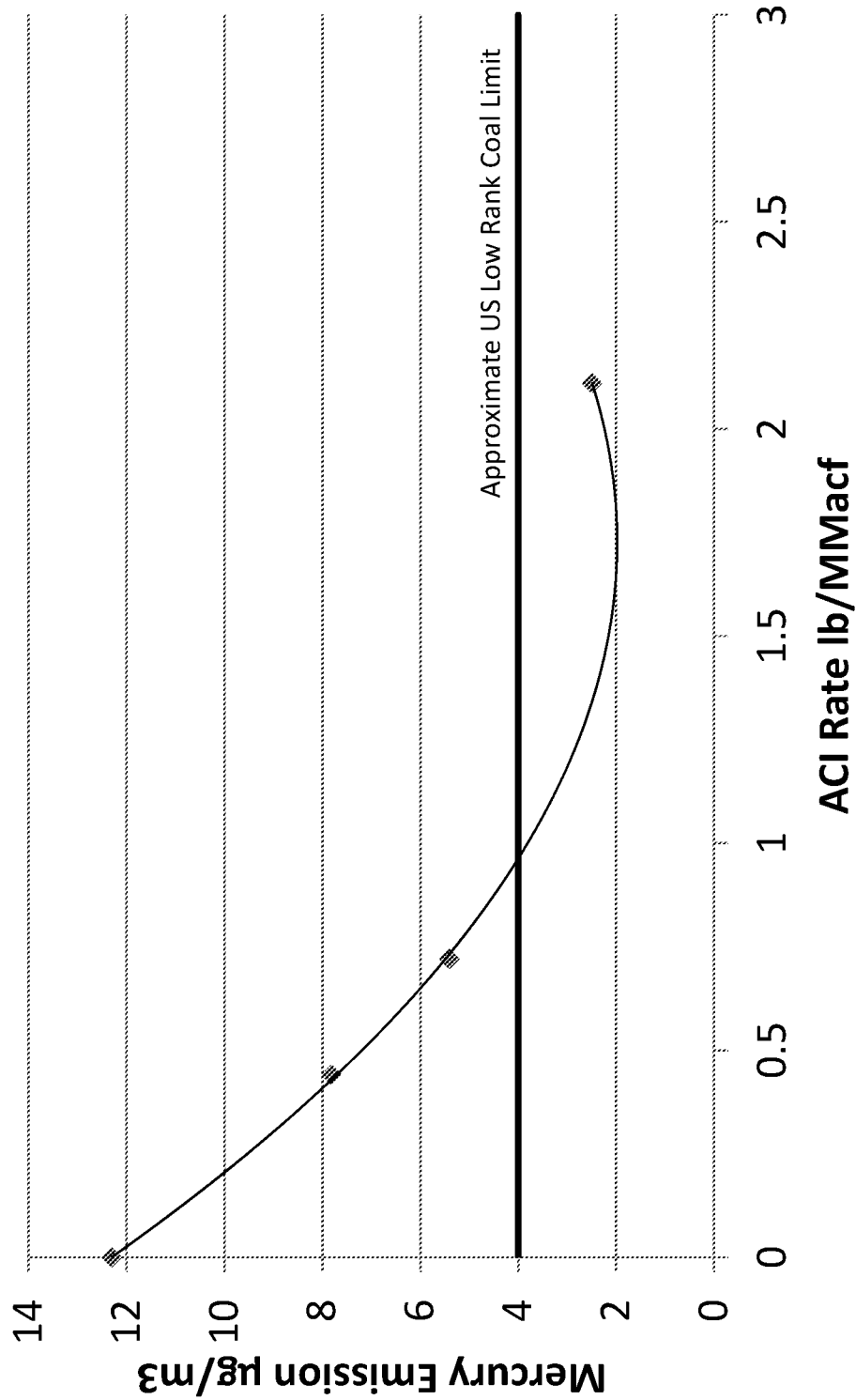
FIG. 7 illustrates the mercury concentration remaining in a flue gas stream as a function of sorbent injection rate to a 1 MW slipstream of an approximately 300 MW unit burning low rank lignite coal with flue gas stream temperatures near 350° F.

FIG. 7 illustrates mercury remaining in the flue gas stream following Sample C injection. As illustrated in FIG. 7, Sample C achieves compliance at a sample injection rate of about 1 lb/MMacf. The trendline has a slope at the compliance limit of approximately −6.067.

While various embodiments have been described in detail, it is apparent that modifications and adaptations of those embodiments will occur to those skilled in the art. However, is to be expressly understood that such modifications and adaptations are within the spirit and scope of the present disclosure.

What is claimed is:

1. A method for removal of mercury from a flue gas stream, comprising:
    injecting particles of a multi-functional composition of matter into a flue gas stream comprising mercury, the multi-functional composition of matter comprising at least about 20 wt. % and not greater than about 75 wt. % fixed carbon, at least about 20 wt. % and not greater than about 50 wt. % minerals, and at least about 3 wt. % and not greater than about 12 wt. % aqueous-based solubilizing medium, wherein:
        the particles of the multi-functional composition of matter have a median particle size of not greater than about 15 micron;
        the particles of the multi-functional composition of matter have a sum of micropore volume plus mesopore volume that is at least about 0.20 cc/g;
        the particles of the multi-functional composition of matter have a ratio of micropore volume to mesopore volume that is at least about 0.7 and is not greater than about 1.5; and
        the particles of the multi-functional composition of matter have a tapped density that is at least about 0.35 g/ml and is not greater than about 0.575 g/ml; and
    separating, from the flue gas stream, the multi-functional composition of matter particles comprising mercury collected from the flue gas stream.

2. The method of claim 1, wherein the median particle size is at least about 5 micron.

3. The method of claim 1, wherein the ratio of micropore volume to mesopore volume is at least about 0.9 and is not greater than about 1.5.

4. The method of claim 1, wherein a nominal number of particles per gram of the multi-functional composition of matter is at least about 0.8 billion.

5. The method of claim 1, wherein a nominal number of particles per gram of the multi-functional composition of matter is at least about 2.5 billion.

6. The method of claim 1, wherein the minerals are selected from the group consisting of calcium-containing minerals, potassium-containing minerals, iron-containing minerals, silicon-containing minerals, sodium-containing minerals, tin-containing minerals, zinc-containing minerals, magnesium-containing minerals, aluminosilicate containing minerals, and combinations thereof.

7. The method of claim 1, wherein the minerals comprise oxide minerals.

8. The method of claim 1, wherein the minerals comprise at least 1 wt. % iron-containing minerals.

9. The method of claim 1, wherein the multi-functional composition of matter comprises at least about 25 wt. % and not greater than about 40 wt. % minerals.

10. The method of claim 1, wherein the multi-functional composition of matter has a Hardgrove Grindability Index of at least about 90.

11. The method of claim 1, wherein the multi-functional composition of matter has a particle density and wherein, when the particle density is measured by liquid mercury volume-displacement, the particle density is at least about 0.5 g/cc and not greater than about 0.9 g/cc and, when the particle density is measured by sedimentary volume displacement, the particle density is at least about 0.3 g/cc and not greater than about 1.5 g/cc, wherein the particle density correlates to a surface area to volume ratio of the multi-functional composition of matter.

12. The method of claim 1, further comprising a halogen-containing compound, wherein the multi-functional composition of matter comprises at least about 1 wt. % and not greater than about 15 wt. % of the halogen-containing compound.

13. The method of claim 12, wherein the halogen-containing compound is a bromine salt.

14. The method of claim 1, wherein the multi-functional composition of matter is injected into the flue gas stream having which has a temperature of at least about 325° F.

15. The method of claim 1, wherein the multi-functional composition of matter is injected into the flue gas stream in a location that is after an air preheater unit and before a particulate matter collection device.

16. The method of claim 1, wherein the multi-functional composition of matter is separated from the flue gas stream by collection in a particulate matter collection device.

17. The method of claim 16, wherein the particulate matter collection device is selected from the group consisting of an electrostatic precipitator and a fabric filter bag house.

18. The method of claim 1, wherein the multi-functional composition of matter causes removal of at least 85% of the mercury from the flue gas stream.

19. A method, comprising:
receiving a flue gas stream comprising mercury;
injecting particles of a multi-functional composition of matter into the flue gas stream, the multi-functional composition of matter comprising at least about 20 wt. % and not greater than about 75 wt. % fixed carbon, at least about 25 wt. % and not greater than about 40 wt. % minerals, and at least about 3 wt. % and not greater than about 8 wt. % aqueous-based solubilizing medium, wherein:
   the particles of the multi-functional composition of matter have a median particle size of at least about 5 micron and not greater than about 15 micron;
   the particles of the multi-functional composition of matter have a sum of micropore volume plus mesopore volume that is at least about 0.24 cc/g;
   the particles of the multi-functional composition of matter have a ratio of micropore volume to mesopore volume is at least about 0.9 and is not greater than about 1.5; and
   the particles of the multi-functional composition of matter have a tapped density that is at least about 0.35 g/ml and is not greater than about 0.51 g/ml; and
separating particles of the the multi-functional composition of matter particles from the flue gas stream, wherein the particles of the multi-functional composition of matter cause removal of at least a portion of the mercury from the flue gas stream.

20. A method, comprising:
receiving a flue gas stream comprising mercury;
injecting particles of a multi-functional composition of matter into the flue gas stream, the multi-functional composition of matter comprising at least about 20 wt. % and not greater than about 75 wt. % fixed carbon, at least about 20 wt. % and not greater than about 50 wt. % minerals, and at least about 3 wt. % and not greater than about 12 wt. % aqueous-based solubilizing medium, wherein:
   the particles of the multi-functional composition of matter have a median particle size of at least about 5 micron and not greater than about 15 micron;
   the particles of the multi-functional composition of matter have a sum of micropore volume plus mesopore volume that is at least about 0.24 cc/g;
   the particles of the multi-functional composition of matter have a ratio of micropore volume to mesopore volume is at least about 0.9 and is not greater than about 1.5; and
   the particles of the multi-functional composition of matter have a tapped density that is at least about 0.35 g/ml and is not greater than about 0.51 g/ml;
   the particles of the multi-functional composition of matter have a particle density and wherein, when the particle density is measured by liquid mercury volume-displacement, the particle density of the particles of the multi-functional composition of matter is at least about 0.5 g/cc and not greater than about 0.9 g/cc and, when the particle density is measured by sedimentary volume displacement, the particle density of the particles of the multi-functional composition of matter is at least about 0.3 g/cc and not greater than about 1.5 g/cc, wherein the particle density correlates to a surface area to volume ratio of the multi-functional composition of matter; and
separating the particles of the multi-functional composition of matter from the flue gas stream, wherein the multi-functional composition of matter causes removal of at least a portion of the mercury from the flue gas stream.

* * * * *